United States Patent
Li et al.

(10) Patent No.: US 11,423,530 B1
(45) Date of Patent: Aug. 23, 2022

(54) INTELLIGENT REPLACEMENT DEVICE AND METHOD FOR TRAP BOARD IN TEA GARDEN BASED ON IMAGE CHANNEL COMPUTATION

(71) Applicant: Zhejiang University, Hangzhou (CN)

(72) Inventors: Xiaoli Li, Hangzhou (CN); Yong He, Hangzhou (CN); Wenkai Zhang, Hangzhou (CN); Li Zhou, Hangzhou (CN); Lei Bian, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 17/575,768

(22) Filed: Jan. 14, 2022

(30) Foreign Application Priority Data

Aug. 20, 2021 (CN) .......................... 202110960855.9

(51) Int. Cl.
*G06T 7/00* (2017.01)
*A01M 1/12* (2006.01)
*A01M 1/14* (2006.01)

(52) U.S. Cl.
CPC .......... *G06T 7/0008* (2013.01); *G06T 7/0004* (2013.01); *A01M 1/12* (2013.01); *A01M 1/14* (2013.01)

(58) Field of Classification Search
CPC ...... G06T 7/0008; G06T 7/0004; A01M 1/12; A01M 1/14
USPC ............. 382/100, 141; 43/58, 107, 114, 115
See application file for complete search history.

(56) References Cited

U.S. PATENT DOCUMENTS

| 6,618,983 | B1 * | 9/2003 | Spragins | A01M 1/2016 |
| | | | | 43/132.1 |
| 9,578,865 | B1 * | 2/2017 | Lin | G06F 3/005 |
| 10,796,161 | B2 * | 10/2020 | Bisberg | H04N 5/23206 |
| 2004/0128902 | A1 * | 7/2004 | Kollars, Jr. | A01M 1/22 |
| | | | | 43/107 |
| 2006/0016120 | A1 * | 1/2006 | Masters | A01M 1/14 |
| | | | | 43/107 |
| 2015/0216158 | A1 * | 8/2015 | Mizrach | A01M 1/026 |
| | | | | 43/107 |

FOREIGN PATENT DOCUMENTS

| KR | 101301071 B1 * | 3/2018 | ............. A01M 1/14 |
| KR | 20180051886 A * | 5/2018 | ............. G06T 7/35 |
| KR | 20200072336 A * | 6/2020 | ............. A01M 1/14 |

* cited by examiner

*Primary Examiner* — Sheela C Chawan
(74) *Attorney, Agent, or Firm* — Troutman Pepper Hamilton Sanders LLP; Christopher C. Close, Jr.

(57) ABSTRACT

The present disclosure provides an intelligent replacement device and method for a trap board in a tea garden based on image channel computation. The device includes a trap board supply module, a trap board sticker removal module and a machine vision control module fixed on a machine frame, where the machine vision control module is configured to acquire an image of a present trap board in the trap board supply module, determine whether the present trap board fails according to the image, control, in response to failure of the present trap board, the trap board supply module to replace the trap board, and control the trap board sticker removal module to remove a film of a replaced trap board. The present disclosure can replace the trap board in the tea garden automatically, timely and accurately instead of the manual operation.

6 Claims, 8 Drawing Sheets

B-G channel

G channel

INTELLIGENT REPLACEMENT DEVICE AND METHOD FOR TRAP BOARD IN TEA GARDEN BASED ON IMAGE CHANNEL COMPUTATION

CROSS REFERENCE TO RELATED APPLICATIONS

This patent application claims the benefit and priority under 35 U.S.C. § 119(e) of 202110960855.9 filed on 20 Aug. 2021, the disclosure of which is incorporated by reference herein in its entirety as part of the present application.

TECHNICAL FIELD

The present disclosure relates to the technical field of intelligent agricultural devices, and in particular, to an intelligent replacement device and method for a trap board in a tea garden based on image channel computation.

BACKGROUND ART

China has become the leading tea production region in the world, with the tea planting history of more than 3,000 years. Soaked teas are popular with consumers for the special aromas and mouthfeels. However, the decreased tea yield due to insects causes enormous economic losses. As the control with farm chemicals contaminates the soil and affects the safety of teas, it is particularly important to control diseases and insects of the teas with environment-friendly control technologies. Trap boards have been widely used in tea gardens as one of the main environment-friendly control technologies to kill the insects, which reduces the usage amounts of the farm chemicals, alleviates the environmental pollution of the tea gardens, ensures the safety of the teas, and increases the economic benefits of the tea gardens.

However, during implementation of the trap boards in the tea gardens for the insect control, there are a large number of trap boards that need to be timely replaced before expired. The replacement of the trap boards is time-consuming and labor-consuming to increase the labor cost; and particularly for tea gardens with large areas or complicated landforms, the replacement is more time-consuming. Hence, it is desirable to provide an automatic replacement device for the trap board to replace the manual operation, improve the replacement efficiency of the trap board, and reduce the labor cost. Through literature consultation and market investigation in the prior art, there hasn't been any automatic replacement device that uses the machine vision to determine the failure of the trap board in real-time instead of the manual operation.

In the prior art, although the sticker for sticking the insects can be replaced periodically with the timing function of the timer to save the labor cost, the insects stuck on the sticker cannot be monitored in real time. It is possible that the trap board has expired completely before the specified replacement time of the timer, or the replacement is made to an unexpired trap board to cause the waste of resources. In addition, the scheme is only applied to rolling sticky boards but not the existing mainstream rectangular trap boards, and is hardly promoted to markets.

SUMMARY

An objective of the present disclosure is to provide an intelligent replacement device and method for a trap board in a tea garden based on image channel computation. The present disclosure can replace the trap board in the tea garden automatically, timely and accurately instead of the manual operation, and yield the higher insect trapping efficiency in the tea garden and the better tea quality.

To implement the above objective, the present disclosure provides the following solutions:

An intelligent replacement device for a trap board in a tea garden based on image channel computation includes a trap board supply module, a trap board sticker removal module and a machine vision control module fixed on a machine frame, where the machine vision control module is configured to acquire an image of a present trap board in the trap board supply module, determine whether the present trap board fails according to the image, control, in response to failure of the present trap board, the trap board supply module to replace the trap board, and control the trap board sticker removal module to remove a film of a replaced trap board.

Further, the intelligent replacement device may further include a waste trap board collection box and a waste trap board guide disc fixed on the machine frame; and the waste trap board collection box may collect an expired trap board through the waste trap board guide disc.

Further, the trap board supply module may include: a trap board supply box as well as an upper ejection plate, an ejection plate fixing post, a second lead screw, a lower ejection plate, a second step motor, a step motor fixing frame and trap board units arranged in the trap board supply box; a cover may be fixed on the trap board supply box; the upper ejection plate and the lower ejection plate may be fixed together through the ejection plate fixing post; multiple trap board units may be fixed on the upper ejection plate; the second step motor may be fixed on the step motor fixing frame; and the lower ejection plate may be adjusted through the second lead screw, thereby adjusting the upper ejection plate to feed the trap board units.

Further, the trap board units each may include a trap board, a trap board sticker and a trap board fixing plate; the trap board may be fixed on the trap board fixing plate; and the trap board sticker may be attached with the trap board together through an adhesive layer.

Further, the trap board sticker removal module may include: a first air guide tube, a triaxial cylinder, a guide track, a film remover fixing plate, a waste trap board sticker collection box, a slide block, a chuck support beam, chuck cylinders, outer chuck jaws, first lead screw fixing pieces, a first lead screw, a second air guide tube, a first step motor, a second pneumatic control valve, a first pneumatic control valve, an airflow distribution guide tube, an air pump, a triangular steel support frame, a steel I-beam, inner chuck jaws and a support plate, where the triangular steel support frame is fixed on an outer wall of the trap board supply box; the film remover fixing plate 7 is fixed on the triangular steel support frame; the waste trap board sticker collection box and the guide track are fixed on the film remover fixing plate; the first lead screw fixing pieces are fixed on two ends of the film remover fixing plate; and the first lead screw is fixed between two first lead screw fixing pieces;

the first step motor is fixed on the first lead screw fixing pieces; the first step motor is configured to drive the first lead screw to rotate, thereby driving the chuck support beam connected with the first lead screw to move left and right; and the slide block is connected and fixed with a lower surface of the chuck support beam, and slides left and right along the guide track as the chuck support beam moves;

there are two outer chuck jaws in total that are respectively fixed on two sides of the chuck support beam and are symmetric with respect to a central plane of the chuck support beam; there are two chuck cylinders in total that are respectively arranged in centers of upper surfaces of the outer chuck jaws and are fixed above the chuck support beam; and the inner chuck jaws are respectively connected with push rods of the chuck cylinders, located in the outer chuck jaws, and configured to clamp and release the trap board sticker; and the triaxial cylinder is fixed on an upper end surface of the steel I-beam; a lower end surface of the steel I-beam is fixed on the outer wall of the trap board supply box; the support plate is fixed on a push rod of the triaxial cylinder; the triaxial cylinder is connected with the first pneumatic control valve through the first air guide tube; the chuck cylinders each are connected with the second pneumatic control valve through the second air guide tube; the second pneumatic control valve and the first pneumatic control valve are connected with the air pump through the airflow distribution guide tube; and the air pump is provided at the bottom of the machine frame.

Further, the machine vision control module may include an industrial camera 12 and a controller 23; the industrial camera may be provided at a highest point of the machine frame, and configured to acquire an image of the trap board; and the controller may be provided at a side of the machine frame.

The present disclosure further provides an intelligent replacement method for a trap board in a tea garden based on image channel computation, which is applied to the intelligent replacement device for a trap board in a tea garden based on image channel computation, and includes:

acquiring an image of the trap board;

splitting channels of an acquired image of the trap board;

computing a matrix F norm of an image corresponding to a split G channel and a matrix F norm of an image corresponding to a B-G channel, and respectively representing the norms as a first matrix F norm and a second matrix F norm;

computing a ratio function of the first matrix F norm to the second matrix F norm;

determining whether the trap board fails according to the ratio function; and determining that the trap board fails and replacing the trap board if yes.

Further, the determining whether the trap board fails according to the ratio function may specifically include:

determining whether the ratio function y(n) is greater than a first determination factor $\lambda$, n being a number of image acquisition times;

continuously acquiring an image of the trap board if yes;

determining whether y(n−1)−y(n) is greater than a second determination factor $\kappa$ if no;

continuously acquiring an image of the trap board if yes; and determining that the trap board fails and replacing the trap board if no.

Based on specific embodiments provided in the present disclosure, the present disclosure achieves the following technical effects:

(1) The device is highly automatic, automatically replaces the trap board instead of manual operation, and reduces the labor cost.

(2) The device intelligently determines the trap board with the machine vision, can prevent the waste of the trap board due to insufficient artificial experience, and further prevent the problems of poor insect trapping effect and the like because the trap board is not replaced in time.

(3) The device can yield the better insect trapping effect, reduce the usage of farm chemicals, alleviate the pollution in the tea garden, and improve the product quality and added values of the tea.

BRIEF DESCRIPTION OF THE DRAWINGS

To describe the technical solutions in embodiments of the present disclosure or in the prior art more clearly, the accompanying drawings required in the embodiments will be briefly described below. Apparently, the accompanying drawings in the following description show merely some embodiments of the present disclosure, and other drawings can be derived from these accompanying drawings by a person of ordinary skill in the art without creative efforts.

Figure 1:
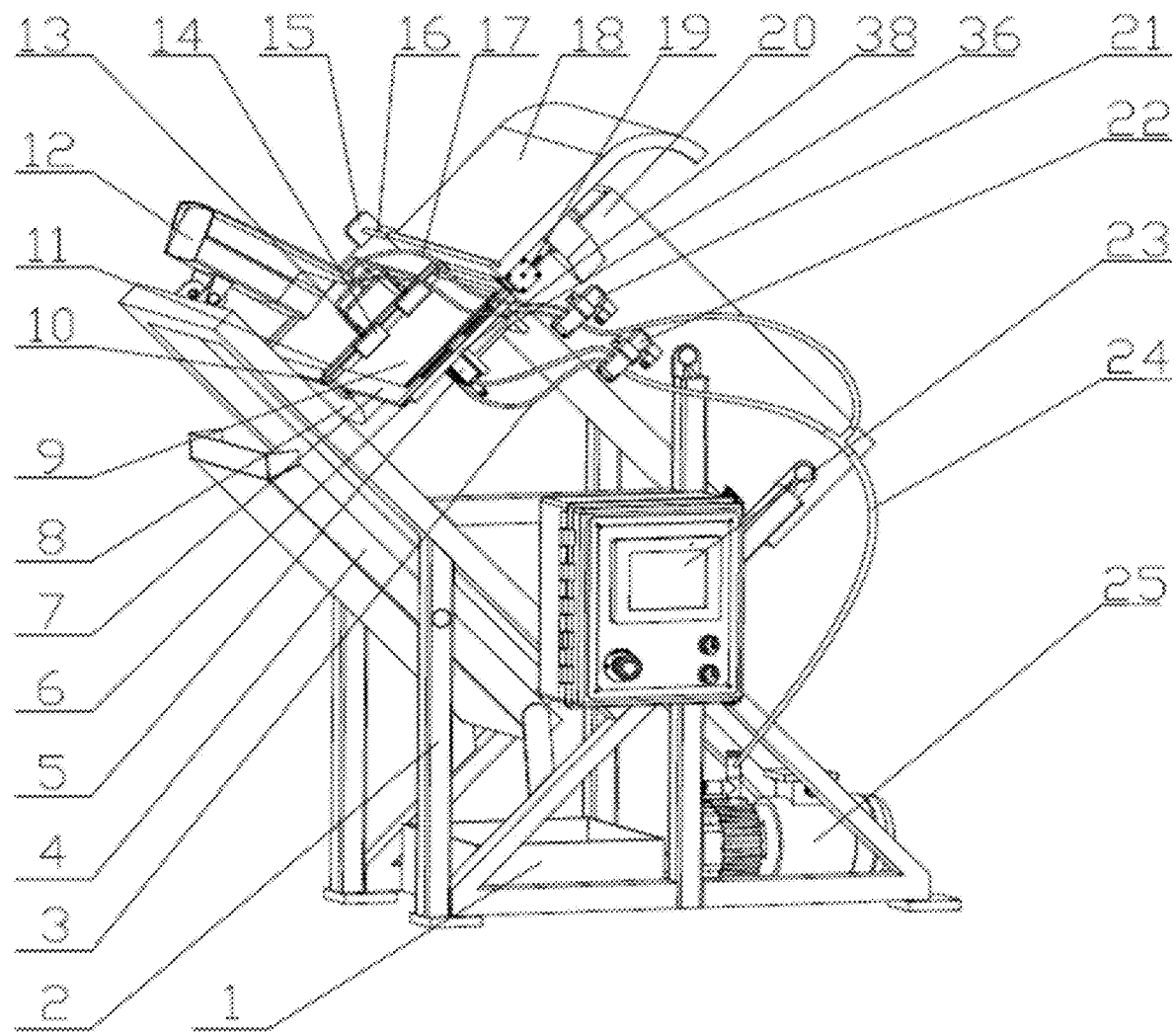
FIG. 1 illustrates a schematic structural diagram of an intelligent replacement device for a trap board in a tea garden based on image channel computation according to an embodiment of the present disclosure.

Reference numerals:

1-waste trap board collection box, 2-machine frame, 3-first air guide tube, 4-waste trap board guide disc, 5-triaxial cylinder, 6-guide track, 7-film remover fixing plate, 8-waste trap board sticker collection box, 9-trap board, 10-slide block, 11-chuck support beam, 12-industrial camera, 13-chuck cylinder, 14-outer chuck jaw, 15-first lead screw fixing piece, 16-first lead screw, 17-second air guide tube, 18-cover, 19-first step motor, 20-trap board supply box, 21-second pneumatic control valve, 22-first pneumatic control valve, 23-controller, 24-airflow distribution guide tube, 25-air pump, 26-trap board fixing plate, 27-trap board, 28-trap board sticker, 29-upper ejection plate, 30-ejection plate fixing post, 31-second lead screw, 32-lower ejection plate, 33-step motor fixing frame, 34-second step motor, 35-triangular steel support frame, 36-steel I-beam, 37-inner chuck jaw, and 38-support plate.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by the person of ordinary skill in the art on the basis of the embodiments of the present disclosure without creative efforts shall fall within the protection scope of the present disclosure.

An objective of the present disclosure is to provide an intelligent replacement device and method for a trap board in a tea garden based on image channel computation. The present disclosure can replace the trap board in the tea garden automatically, timely and accurately instead of the manual operation, and yield the higher insect trapping efficiency in the tea garden and the better tea quality.

To make the above objectives, features, and advantages of the present disclosure clearer and more comprehensible, the present disclosure will be further described in detail below with reference to the accompanying drawings and the specific implementations.

As shown in FIG. 1, the intelligent replacement device for a trap board in a tea garden based on image channel computation provided by the present disclosure includes a trap board supply module, a trap board sticker removal module, a machine vision control module, a waste trap board guide disc 4 and a waste trap board collection box 1; and the above components are all fixed on a machine frame 23.

Figure 3:
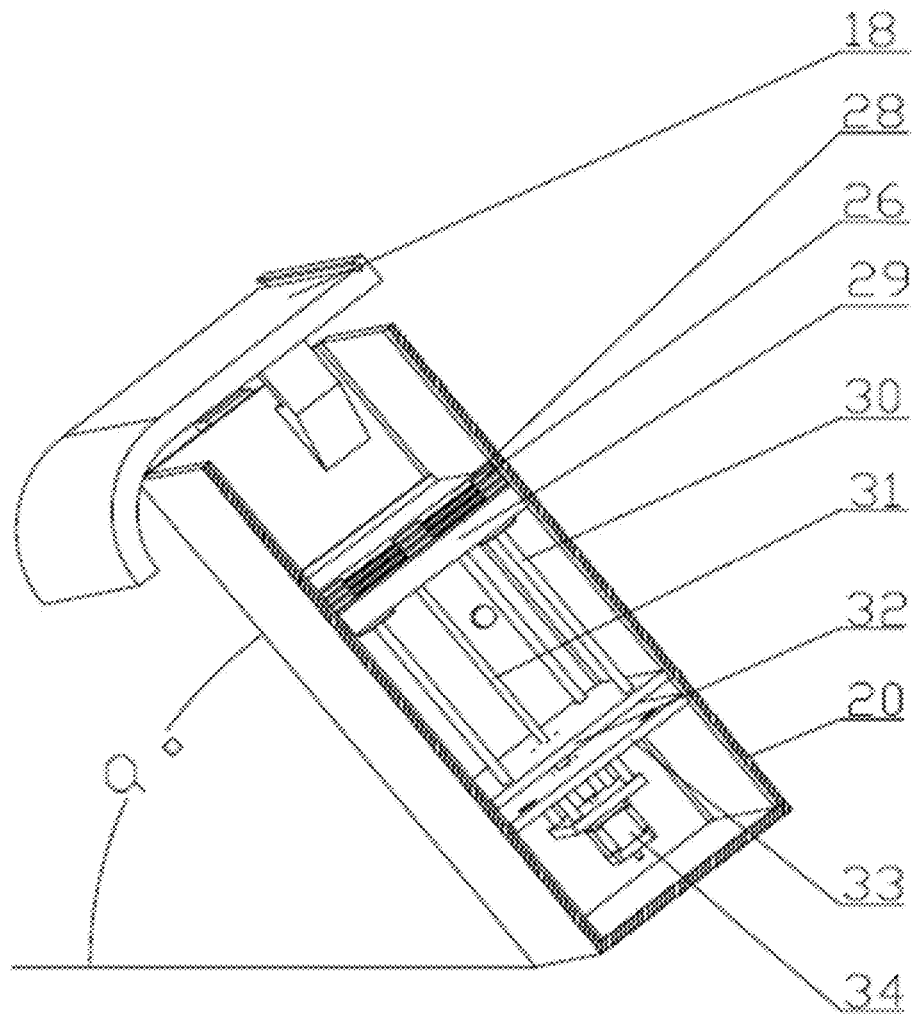
FIG. 3 illustrates an assembly diagram of a trap board supply module according to an embodiment of the present disclosure.

As shown in FIG. 1 and FIG. 3, the trap board supply module includes a trap board supply box 20 as well as an upper ejection plate 29, an ejection plate fixing post 30, a second lead screw 31, a lower ejection plate 32, a second step motor 34, a step motor fixing frame 33 and trap board units arranged in the trap board supply box 20. A cover 18 is fixed on the trap board supply box 20 to keep out the sun and the rain. The upper ejection plate 29 and the lower ejection plate 32 are fixed together through the ejection plate fixing post 30 to support and feed a trap board fixing plate 26. Multiple trap board units are fixed on the upper ejection plate 29. The second step motor 34 is fixed on the step motor fixing frame 33; and the lower ejection plate 32 is adjusted through the second lead screw 31, thereby adjusting the upper ejection plate 29 to feed a trap board 27. The trap board supply box 20 is inclined at a certain angle of a° with respect to the horizontal direction, such that the trap board 27 and the trap board fixing plate 26 can automatically fall onto the trap board sticker removal module under the gravity for the trap board sticker removal action in the next step. Preferably, the a° is in a range of 30-60°.

Figure 2:
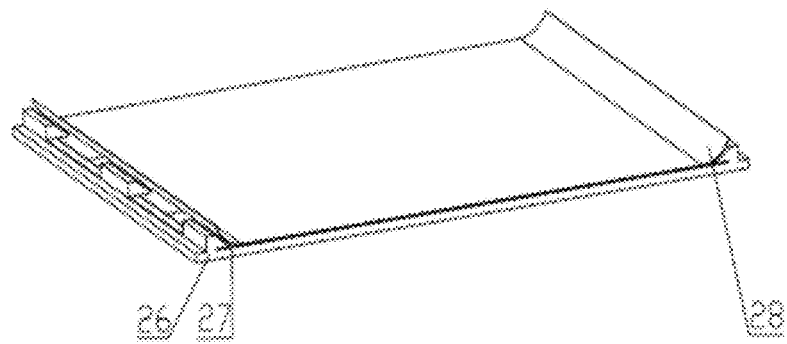
FIG. 2 illustrates an assembly diagram of a trap board and a trap board fixing plate according to an embodiment of the present disclosure.

As shown in FIG. 2, the trap board 27 and the trap board sticker 28 are attached together through an adhesive layer, and can be fixed on the trap board fixing plate 26. Three inclined grappling claws are respectively provided on two sides of the trap board fixing plate 26, to locate the trap board sticker 28 and further separate the trap board 27 from two sides of the trap board sticker 28, thereby removing the sticker subsequently.

Figure 4:
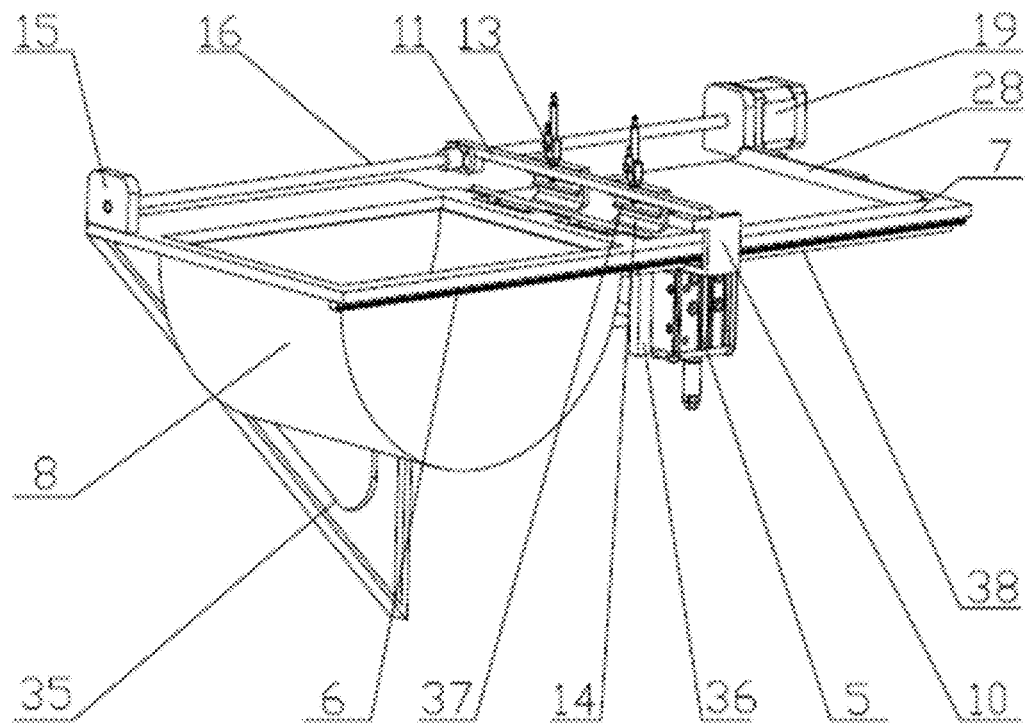
FIG. 4 illustrates an assembly diagram of a trap board sticker removal module according to an embodiment of the present disclosure.
Figure 5:
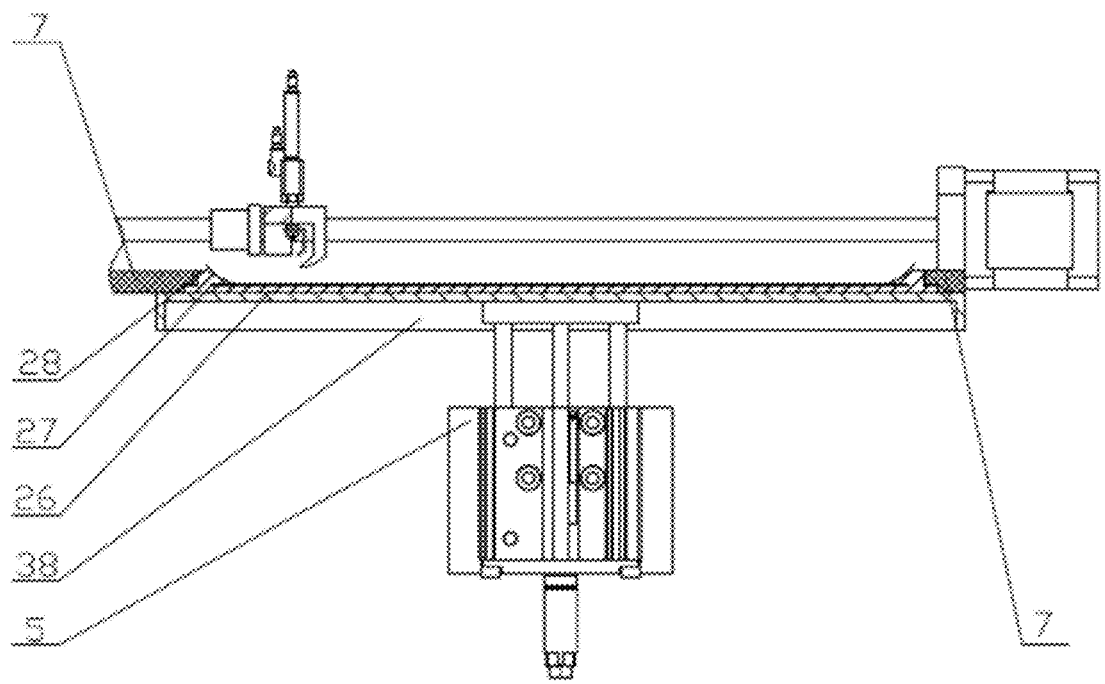
FIG. 5 illustrates a partial sectional diagram of a trap board sticker removal module according to an embodiment of the present disclosure.

As shown in FIG. 1, FIG. 4 and FIG. 5, the trap board sticker removal module includes: a first air guide tube 3, a triaxial cylinder 5, a guide track 6, a film remover fixing plate 7, a waste trap board sticker collection box 8, a slide block 10, a chuck support beam 11, chuck cylinders 13, outer chuck jaws 14, first lead screw fixing pieces 15, a first lead screw 16, a second air guide tube 17, a first step motor 19, a second pneumatic control valve 21, a first pneumatic control valve 22, an airflow distribution guide tube 24, an air pump 25, a triangular steel support frame 35, a steel I-beam 36, inner chuck jaws 37 and a support plate 38.

The triangular steel support frame 35 is fixed on an outer wall of the trap board supply box 20, and configured to support the trap board sticker removal module. The film remover fixing plate 7 is fixed on the triangular steel support frame 35, and an upper plane of the film remover fixing plate 7 also keeps an angle of a° with the horizontal plane.

The first lead screw fixing pieces 15, the waste trap board sticker collection box 8, and the guide track 6 are all fixed on the film remover fixing plate 7. There are two first lead screw fixing pieces 15 in total that are respectively fixed on left and right sides of an upper edge of the film remover fixing plate 7 and configured to support the first lead screw 16.

The first step motor 19 is fixed on the right first lead screw fixing piece 15; and by rotating the first lead screw 16, the chuck support beam 11 is driven to move left and right. The slide block 10 is connected and fixed with a lower surface of the chuck support beam 11, and slides left and right along the guide track 6 as the chuck support beam 11 moves. There are two outer chuck jaws 14 in total that are respectively fixed on left and right sides of the chuck support beam 11 and are symmetric with respect to a central plane of the chuck support beam 11. There are two chuck cylinders 13 in total that are respectively arranged in centers of upper surfaces of the outer chuck jaws 14 and are fixed above the chuck support beam 11. The inner chuck jaws 37 are respectively connected with push rods of the chuck cylinder 13 to implement the linear reciprocating motion, located in the outer chuck jaws 14, and configured to clamp and release the trap board sticker 28.

The triaxial cylinder 5 is fixed on an upper end surface of the steel I-beam 36, and a lower end surface of the steel I-beam 36 is fixed on the outer wall of the trap board supply box 20. The support plate 38 is fixed on a push rod of the triaxial cylinder 5, to support the trap board fixing plate 26 and fix the trap board fixing plate 26 with the film remover fixing plate 7, for fear of the displacement of the trap board fixing plate during film removal. Upon the completion of the film removal, the support plate 38 moves downward with the push rod of the triaxial cylinder 5; and the trap board 26 and the trap board sticker 27 fall into the waste trap board collection box 1 along the waste trap board guide disc 4.

As shown in FIG. 1, the triaxial cylinder 5 is connected with the first pneumatic control valve 22 through the first air guide tube 3; the chuck cylinder 13 is connected with the second pneumatic control valve 21 through the second air guide tube 17; the second pneumatic control valve 21 and the first pneumatic control valve 22 are jointly connected with the air pump 25 through the airflow distribution guide tube 24; and the air pump 25 is provided at the bottom of the machine frame 2.

As shown in FIG. 1, the machine vision control module includes an industrial camera 12 and a controller 23; the industrial camera 12 is provided at a highest point of the machine frame 2, and configured to acquire an image of the trap board 27; and the controller is provided at a side of the machine frame 2.

Figure 6:
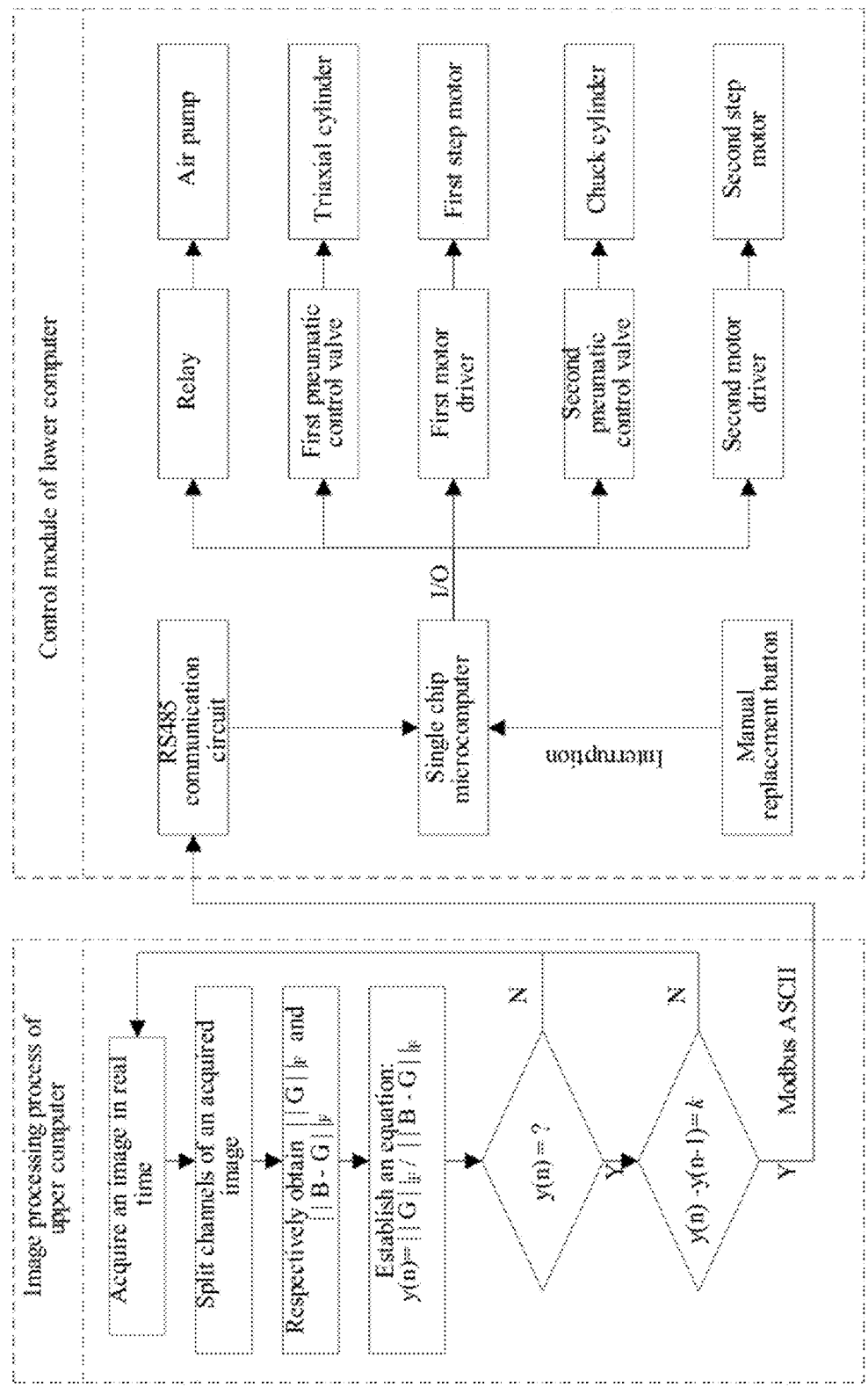
FIG. 6 illustrates a failure determination method of a trap board and a control flow chart according to an embodiment of the present disclosure.

As shown in FIG. 6, the present disclosure further provides an intelligent replacement method for a trap board in a tea garden based on image channel computation, including the following steps:

Step 1: Acquire an image of the trap board by an industrial camera 12.

After the trap board is placed in the tea garden, the industrial camera is used to acquire the image of the trap board. In order to prevent the weather from affecting the image acquisition effect, the fixed light source and the fixed focal length of the camera are used. The sampling frequency f=2 d/time is set.

Figure 7:
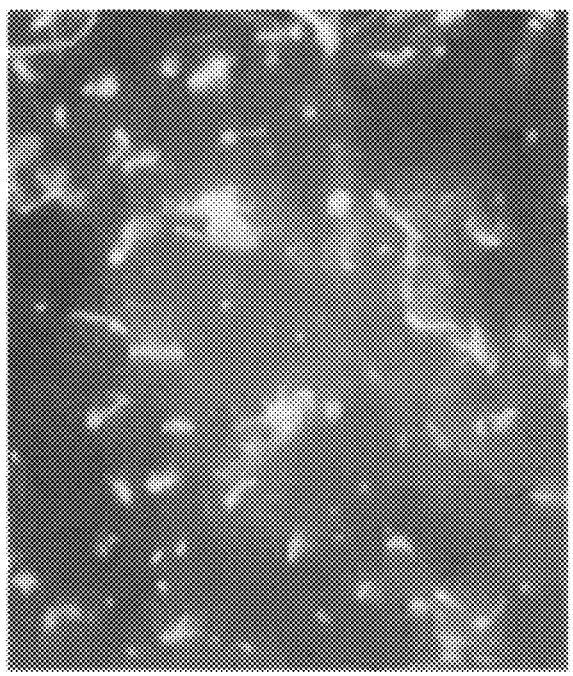
FIG. 7 illustrates a schematic diagram of images corresponding to a B channel and a (B-G channel) obtained by splitting channels of an acquired image according to an embodiment of the present disclosure.
Figure 7:
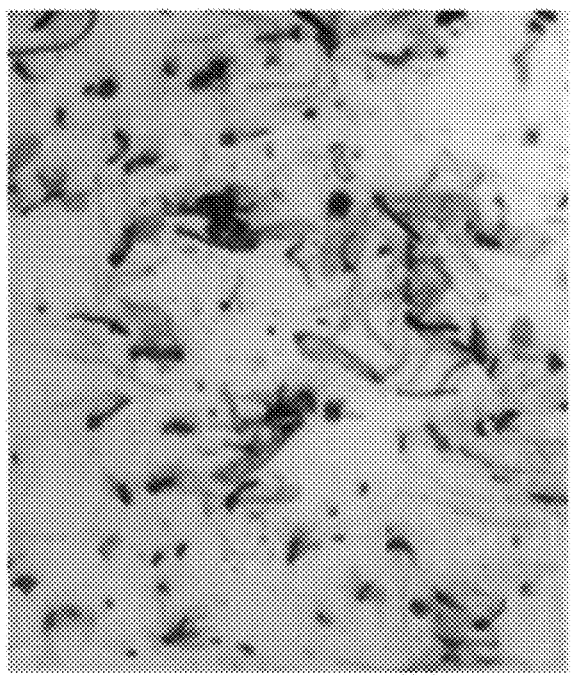

Step 2: Split B, G and R channels of an acquired image. The computed image results of the B channel and the B-G channel are as shown in FIG. 7.

Figure 8:
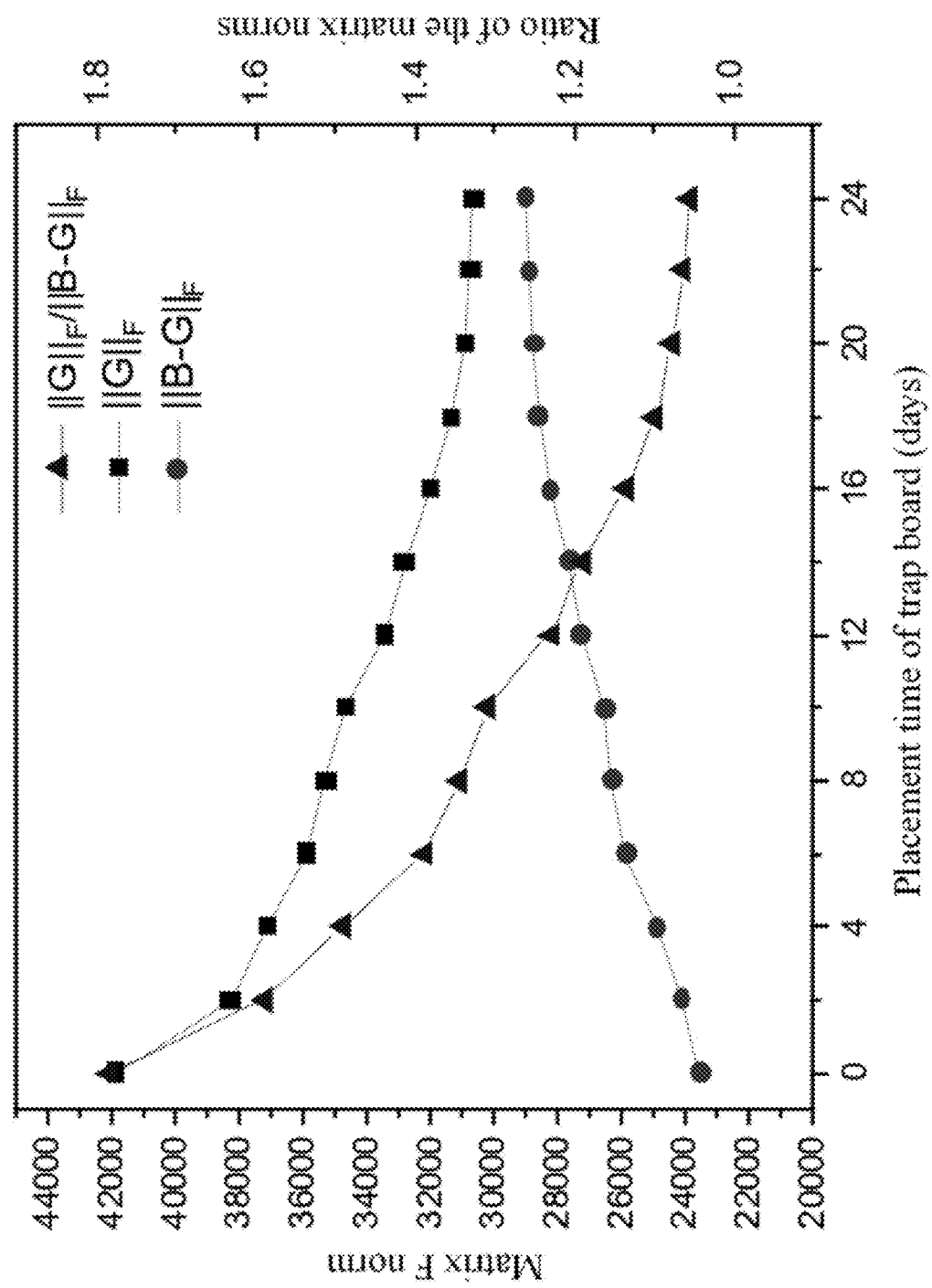
FIG. 8 illustrates a change trenchancy of a channel computed result of an image according to an embodiment of the present disclosure.

Step 3: Compute matrix F norms of images corresponding to the G channel and the B-G channel, respectively represent the norms as a first matrix F norm and a second matrix F norm, and compute a ratio function y(n), with the result as shown in FIG. 8.

$$y(n) = \frac{\|G\|_F}{\|B-G\|_F}$$

In the Equation, $\|G\|_F$ is the matrix F norm of the image corresponding to the G channel, $\|B-G\|_F$ is the matrix F norm of the image corresponding to the B-G channel, and n is a number of image acquisition times.

As can be seen from the figure, the $\|G\|_F$ is trending down over the placement time, while the $\|B-G\|_F$ is trending up over the placement time. Meanwhile, the ratio function y(n) shows a decreasing trend over the placement time, in which the result approaches to 1 gradually, and the longer the placement time, the slower the speed that the y(n) decreases. It is indicated that the longer the placement time that the trap board is placed, the number of stuck insects increases constantly but the insect sticking effect decreases constantly.

Furthermore, the first determination factor $\lambda=1.1$ is set for preliminary determination. If y(n)≤$\lambda$, Step 4 is executed to finally determine whether the trap board fails; and if y(n)>$\lambda$, a next image processing cycle is executed.

As shown in Table 1, when the trap board is placed for 18 d, the determination condition Y(n)≤$\lambda$ is met, and step 4 is executed to finally determine whether the trap board fails.

TABLE 1

Computed results of y(n − 1) − y(n) in the embodiments

| | Placement time of the trap board (days) | | | | |
|---|---|---|---|---|---|
| | 16 | 18 | 20 | 22 | 24 |
| y(n) | 1.134 | 1.096 | 1.076 | 1.063 | 1.055 |
| y(n − 1) − y(n) | — | 0.038 | 0.02 | 0.013 | 0.008 |

Step 4: Set a second determination factor $\kappa=0.001$, enable an upper computer to send a processing result to a single chip microcomputer based on a Modbus protocol through an RS485 communication circuit in a form of an instruction if y(n−1)−y(n)≤$\kappa$ is met, start a trap board replacement procedure, and execute a next image processing cycle if a computed result is greater than the second determination factor $\kappa$. As can be seen from Table 1, when the trap board is placed for 24 d, the determination condition y(n−1)−y(n)≤$\kappa$ is met.

y(n)≤$\lambda$ is preliminarily determined in Step 3, which is useful to eliminate the phenomenon that the trap board does not expire due to accidental factors but the determination condition y(n−1)−y(n)≤$\kappa$ in step 4 is met, thereby preventing the early replacement of the trap board arising from the wrong determination.

In the control method of the execution element, the single chip microcomputer of the lower computer is used for logic control. Upon the reception of a signal on complete failure of the trap board from the upper computer, the single chip microcomputer starts the trap board replacement procedure, and logically controls the execution element through an input/output (I/O) port. There are the following main steps: i: The relay is closed, and the air pump 25 is opened for air inflation. ii: The first pneumatic control valve controls a telescopic rod of the triaxial cylinder to retract, and returns the telescopic rod after 5 s. iii: The first step motor drives the first motor driver to rotate, thereby feeding the trap board. iv: The second solenoid valve controls push rods of the chuck cylinders to stretch out, such that the chuck clamps the trap board sticker. v: The second motor driver controls the second step motor to rotate, thereby driving the chuck to move linearly from left to right to remove the film. vi: The second solenoid valve controls the push rods of the chuck cylinders to retract, such that the chuck releases the trap board sticker. vii: The second motor driver controls the second step motor to rotate reversely, thereby returning the chuck.

In the control method for the execution element, a manual replacement function is provided. After the manual replacement button is triggered, the main program is interrupted, the automatic trap board replacement procedure is directly started, and the main procedure is returned upon the completion of the replacement.

Based on the above control method for the execution element, the intelligent replacement device for a trap board in a tea garden based on image channel computation provided by the present disclosure has the following working process:

In the image acquisition stage: the industrial camera 12 acquires the image of the trap board 27, processes the acquired image with an image processing module of the upper computer, splits and computes the channels, and determines whether the trap board fails. If the channel computed result does not meet the determination condition for the failure, the next image processing cycle is executed; and if the determination result is that the trap board fails, the upper computer sends the instruction to the single chip microcomputer based on the Modbus protocol through the RS485 communication circuit, and starts the trap board replacement procedure.

In the waste trap board releasing stage: upon the reception of the trap board replacement instruction from the upper computer, the single chip microcomputer closes the relay and powers on the air pump 25 through the I/O port for air inflation. After the air pump 25 is ready, the single chip microcomputer controls the first pneumatic control valve 22, such that the push rod of the triaxial cylinder 5 is retracted, and the support plate 38 is driven to move along a retraction direction of the push rod. The trap board fixing plate 26 and the trap board 27 fall into the waste trap board collection box 1 along the waste trap board guide disc 4 under the gravity action. The retracted push rod of the triaxial cylinder 5 is kept for 5 s. The first pneumatic control valve 22 switches the channel, such that the push rod of the triaxial cylinder 5 is stretched out and the support plate 38 is returned, thereby waiting for the feeding of the new trap board.

In the trap board feeding stage: the single chip microcomputer sends the instruction to the second step motor driver, and the second drive motor 34 is driven to rotate the second lead screw 31. Under the rotation of the second lead screw 31, the upper ejection plate 29, the ejection plate fixing post 30 and the lower ejection plate 32 move upward along the inner wall of the trap board supply box 20. Until the trap board fixing plate 26 feeds the trap board supply box 20 to the trap board sticker removal module, the second lead screw 31 stops to rotate, thus implementing the feeding of the new trap board.

In the trap board film removal stage: in the initial state, the chuck support beam 11 is located on the rightmost side of the trap board sticker removal module; the single chip microcomputer sends the instruction to the first step motor, and the first step motor 19 is driven to rotate the first lead screw 16 and translate the chuck support beam 11 from right to left; and until the right edge of the trap board sticker 28 enters the outer chuck jaws 14, the first lead screw 16 stops to rotate. The single chip microcomputer continuously sends the instruction to the second pneumatic control valve 21, such that the push rods of the chuck cylinders 13 are stretched out, and the inner chuck jaws 37 move downward to clamp the right edge of the trap board 27 together with the outer chuck jaws 14. The first step motor 19 drives the first lead screw 16 to rotate continuously, such that the chuck support beam 11 drives the chuck to move leftward together until the trap board 27 is completely removed. Then, the single chip microcomputer controls the second pneumatic control valve 21 to switch the channel, such that the push rods of the chuck cylinders 13 are retracted, thereby releasing the trap board sticker 28. The trap board sticker 28 falls into the waste trap board sticker collection box 8. At last, the single chip microcomputer controls the first step motor 19 to rotate reversely, and the chuck support beam 11 is returned to the rightmost side of the trap board sticker removal module.

The present disclosure can acquire the image of the trap board in real time through the industrial camera, and accurately determine the failure of the trap board with the image channel computation method. The technical method of the present disclosure can replace the trap board in the tea garden automatically, timely and accurately instead of the manual operation, and yield the better insect trapping efficiency in the tea garden and the better tea quality. The method has the strong applicability, and can be applied to the insect trapping work in different seasons and regions; and the present disclosure can make up the blank market where no device for automatically replacing the trap board in the tea garden with the machine vision is provided.

The embodiments are described herein in a progressive manner. Each embodiment focuses on the difference from another embodiment, and the same and similar parts between the embodiments may refer to each other. Since the system disclosed in the embodiments corresponds to the method disclosed in the embodiments, the description is relatively simple, and reference can be made to the method description.

Specific embodiments are used herein to explain the principles and embodiments of the disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of this specification shall not be construed as a limitation to the present disclosure.

What is claimed is:

1. An intelligent replacement device for a trap board in a tea garden based on image channel computation, comprising: a trap board supply module, a trap board sticker removal module and a machine vision control module fixed on a machine frame, wherein the machine vision control module is configured to acquire an image of a present trap board in the trap board supply module, determine whether the present trap board fails according to the image, control, in response to failure of the present trap board, the trap board supply module to replace the trap board, and control the trap board sticker removal module to remove a film of a replaced trap board.

2. The intelligent replacement device for the trap board in the tea garden based on image channel computation according to claim 1, further comprising a waste trap board collection box and a waste trap board guide disc fixed on the machine frame, the waste trap board collection box collecting a failed trap board through the waste trap board guide disc.

3. The intelligent replacement device for the trap board in the tea garden based on image channel computation according to claim 1, wherein:
   the trap board supply module comprises: a trap board supply box, an upper ejection plate, an ejection plate fixing post, a second lead screw, a lower ejection plate, a second step motor, a step motor fixing frame and trap board units arranged in the trap board supply box;
   a cover is fixed on the trap board supply box;
   the upper ejection plate and the lower ejection plate are fixed together through the ejection plate fixing post;
   multiple trap board units are fixed on the upper ejection plate;
   the second step motor is fixed on the step motor fixing frame; and
   the lower ejection plate is adjusted through the second lead screw, thereby adjusting the upper ejection plate to feed the trap board units.

4. The intelligent replacement device for the trap board in the tea garden based on image channel computation according to claim 3, wherein:
   the trap board units each comprise a trap board, a trap board sticker and a trap board fixing plate;
   the trap board is fixed on the trap board fixing plate; and
   the trap board sticker is attached with the trap board together through an adhesive layer.

5. The intelligent replacement device for the trap board in the tea garden based on image channel computation according to claim 4, wherein the trap board sticker removal module comprises: a first air guide tube, a triaxial cylinder, a guide track, a film remover fixing plate, a waste trap board sticker collection box, a slide block, a chuck support beam, chuck cylinders, outer chuck jaws, first lead screw fixing pieces, a first lead screw, a second air guide tube, a first step motor, a second pneumatic control valve, a first pneumatic control valve, an airflow distribution guide tube, an air pump, a triangular steel support frame, a steel I-beam, inner chuck jaws and a support plate, wherein:
   the triangular steel support frame is fixed on an outer wall of the trap board supply box; the film remover fixing plate is fixed on the triangular steel support frame; the waste trap board sticker collection box and the guide track are fixed on the film remover fixing plate; the first lead screw fixing pieces are fixed on two ends of the film remover fixing plate; and the first lead screw is fixed between two first lead screw fixing pieces;
   the first step motor is fixed on the first lead screw fixing pieces; the first step motor is configured to drive the first lead screw to rotate, thereby driving the chuck support beam connected with the first lead screw to move left and right; and the slide block is connected and fixed with a lower surface of the chuck support beam, and slides left and right along the guide track as the chuck support beam moves;
   two outer chuck jaws are respectively fixed on two sides of the chuck support beam and are symmetric with respect to a central plane of the chuck support beam;

two chuck cylinders are respectively arranged in centers of upper surfaces of the outer chuck jaws and are fixed above the chuck support beam; and the inner chuck jaws are respectively connected with push rods of the chuck cylinders, located in the outer chuck jaws, and configured to clamp and release the trap board sticker; and the triaxial cylinder is fixed on an upper end surface of the steel I-beam; a lower end surface of the steel I-beam is fixed on the outer wall of the trap board supply box; the support plate is fixed on a push rod of the triaxial cylinder; the triaxial cylinder is connected with the first pneumatic control valve through the first air guide tube; the chuck cylinders each are connected with the second pneumatic control valve through the second air guide tube; the second pneumatic control valve and the first pneumatic control valve are connected with the air pump through the airflow distribution guide tube; and the air pump is provided at the bottom of the machine frame.

6. The intelligent replacement device for the trap board in the tea garden based on image channel computation according to claim 4, wherein the machine vision control module comprises an industrial camera and a controller; the industrial camera is provided at a highest point of the machine frame, and configured to acquire an image of the trap board; and the controller is provided at a side of the machine frame.

* * * * *